US006530988B1

(12) United States Patent
Silenius (10) Patent No.: US 6,530,988 B1
(45) Date of Patent: Mar. 11, 2003

(54) POROUS COATING PIGMENT AND A METHOD FOR ITS PRODUCTION

(75) Inventor: Petri Silenius, Lohja (FI)

(73) Assignee: Metsa-Serlä Oyj, Espoo (FI)

( * ) Notice: Subject to any disclaimer, the term of this patent is extended or adjusted under 35 U.S.C. 154(b) by 0 days.

(21) Appl. No.: 09/309,604

(22) Filed: May 11, 1999

(30) Foreign Application Priority Data

May 11, 1998 (FI) ................................................ 981045

(51) Int. Cl.⁷ .............................................. C01B 31/24

(52) U.S. Cl. ...................................... 106/464; 423/430

(58) Field of Search ................................ 106/464, 465; 423/430

(56) References Cited

U.S. PATENT DOCUMENTS

| | | | | |
|---|---|---|---|---|
| 4,241,142 A | 12/1980 | Kaliski et al. | ............... | 428/511 |
| 4,298,652 A | 11/1981 | Suzuki et al. | ............... | 428/323 |
| 4,390,509 A | 6/1983 | Weston et al. | ............... | 423/313 |
| 5,007,964 A | 4/1991 | Tsukisaka et al. | .......... | 106/464 |
| 5,118,533 A | 6/1992 | Saji et al. | .................... | 427/366 |
| 5,120,365 A | 6/1992 | Kogler | ........................ | 106/415 |
| 5,158,806 A | 10/1992 | Unger | ......................... | 427/359 |
| 5,340,611 A | 8/1994 | Kustermann et al. | ....... | 427/361 |
| 5,411,587 A | 5/1995 | Willis et al. | ................. | 106/486 |

FOREIGN PATENT DOCUMENTS

| | | |
|---|---|---|
| DE | 44 11 987 A1 | 10/1995 |
| EP | 0 411 638 A1 | 2/1991 |
| EP | 0 461 768 A1 | 12/1991 |
| EP | 0 496 269 A2 | 7/1992 |
| EP | 0 515 757 A1 | 12/1992 |
| EP | 0 624 686 A1 | 11/1994 |
| EP | 0 716 931 A1 | 6/1996 |
| EP | 0 853 159 A1 | 7/1998 |
| EP | 0 908 557 A1 | 4/1999 |
| EP | 0 908 558 A1 | 4/1999 |
| EP | 0 908 561 A1 | 4/1999 |
| FI | 74215 | 10/1979 |
| FI | 63614 | 5/1980 |
| FI | 66221 | 3/1981 |
| FI | 2 468 688 | 5/1981 |
| FI | 67568 | 12/1984 |
| FI | 884196 | 3/1989 |
| FI | 96695 | 9/1989 |
| FI | 932475 | 5/1993 |
| FI | 961026 | 9/1997 |
| GB | 496 775 | 12/1938 |
| GB | 1 001 778 | 8/1965 |
| GB | 1 030 195 | 5/1966 |
| GB | 2 189 714 A | 11/1987 |
| GB | 2 262 542 A | 6/1993 |
| SE | 500 472 | 1/1992 |
| WO | WO 85/03316 | 8/1985 |
| WO | WO 95/28522 | 10/1995 |

OTHER PUBLICATIONS

Barzyk, D., et al., "Acidic Group Topochemistry and Fibre–to–Fibre Specific Bond Strength," *J. Pulp Paper Sci.* 23(2):J59–J61 (Feb. 1997).

Dahlvik, P., et al., "Interactions in Coating Colors Induced by Temperature–Sensitive Cellulosic Polymer," *Intl. Paper and Coating Chem. Symp.*, Ottawa, Canada, pp. 155–162 (Jun. 1996).

Malinen, R., "Recent trends in kraft pulping in Finland," *Paper and Timber* 75(1–2):14–15 and 17–19 (1993). (No month).

Sundberg, K., et al., "Interactions between simple electrolytes and dissolved and colloidal substances in mechanical pulp," *Pulp Paper Res. J.* 9(2):125–128 (1994). (No month).

Dialog File 351 (World Patents Index): English language abstract of FI Patent No. 74215, Application No. 791379 (Document AO1), WPI Aceession No. 79–81186B/197945. (No date).

Dialog File 351 (World Patents Index): English language abstract of FI Patent No. 63614, Application No. 793370 (Document AP1), WPI Aceession No. 08–35899C/198020. (No date).

Dialog File 351 (World Patents Index): English language abstract of FI Patent No. 66221, Application No. 802938 (Document AL2), WPI Aceession No. 81–25892D/198115. No date.

Dialog File 351 (World Patents Index): English language abstract of FR 2 468 688 (Document AM2), WPI Accession No. 81–50171D/198128. No date.

English language abstract of FI Patent No. 67568 (Document AN2). No date.

Dialog File 351 (World Patents Index): English language abstract of FI Patent No. 884196 (Document AL3), Derwent World Patents Index, WPI Accession No. 89–087231/12. (No date).

Dialog File 351 (World Patents Index): English language abstract of FI 96695 (Document AM3), WPI Acession No. 89–265340/198937.

English language abstract for SE Patent No. 500 472 (Document AO3). (No date).

(List continued on next page.)

Primary Examiner—Michael Marcheschi
(74) Attorney, Agent, or Firm—Sterne, Kessler, Goldstein & Fox PLLC (57) ABSTRACT

The invention is based on the idea of preparing porous calcium carbonate particles via a degradation reaction from a crystalline initial material which contains the initial components for forming calcium carbonate and additionally initial components for forming the reaction products to be removed from the initial material. In the reaction a substantial portion of the calcium carbonate forms a porous frame in the space occupied by the initial material, around the open space left by the matter leaving the initial material. The invention is also based on the use of such porous calcium carbonate particles as a pigment absorbing printing inks or their solvents on the surface of a printing substrate.

32 Claims, 4 Drawing Sheets

OTHER PUBLICATIONS

Dialog File 351 (World Patents Index): English language abstract of FI 932475 (Document AM4), WPI Accession No. 92–219675/27. (No date).

English language abstract of DE Patent No. 44 11 987 A1 (Document AP4). (No date).

Dialog File 351 (World Patents Index): English language abstract of FI 961026 (Document AM5), WPI Accession No. 97–437502/199741. (No date).

Høydahl, H.–E., "Thermomechanical pulp—fashionable or realistic fiber alternative," *Norsk Skogind.* 29(12):323–328 (Dec. 1975).

Dialog File 240 (Paperchem): English language abstract for Hoydahl, H.–E., "Thermomechanical pulp—fashionable or realistic fiber alternative," *Norsk Skogind.* 29(12):323–328 (Dec. 1975), (Document AR6), Caeser Accession No. 2935.

Kärenlampi, P., "Tensile Strength of a Mixture of Two Pulps," *J. Pulp Pap. Sci.* 21(12):J432–436 (Dec. 1995).

Pisarevskaya, E. A. et al., "Production of bleached aspen groundwood at the Zhidachev Mill," *Bumazh. Prom.* 1:17–18 (Jan. 1981).

Dialog File 240 (Paperchem): English language Abstract for Pisarevskaya, E. A. et al., "Production of bleached aspen groundwood at the Zhidachev Mill," *Bumazh. Prom.* 1:17–18 (Jan. 1981), (Document AR7), Caeser Accession No. 2921.

Richardson, C. A., "TMP (Thermomechanical pulp) in coating base stock," *CPPA Ann. Mtg.* (*Montreal*) *Preprints 63B*:49–51 (Feb. 1977).

Vulchev, V. et al., "Manufacture of groundwood from chips," *Tseluloma Khartiya 9* (4):5–9 (1978). (No month).

Dialog File 240 (Paperchem): English language abstract for Vulchev, V. et al., "Manufacture of groundwood from chips," *Tseluloza Khartiya* 9(4):5–9 (1978), (Document AS8), Caeser Accession No. 2924. (No month).

Patent for Inventions, Abridgments of Specifications, Herlad Printing Works, York, 1954, Abstract for U.K. Patent No. 623,357, p. 39. (No month).

Patent for Inventions, Abridgments of Specifications, Herlad Printing Works, York, 1954, Abstract for U.K. Patent No. 609,927, pp. 141–142. (No month).

Willard, H.H., and Boldyreff, A.W., "The Determination of Calcium by Ignition of Calcuim Oxalate to Carbonate in Air," *J. Am. Chem. Soc.* 52:1888–1892, American Chemical Society (1930). (No month).

Zaki, M.I., and Abdel–Khalik, M., "Thermal Decomposition and Creation of Reactive Solid Surfaces. II. Textural Consequences of the Thermal Decomposition of Alkaline Earth Oxalates," *Colloids and Surfaces 13*:323–332, Elsevier Science Publishers B.V. (1985). (No month).

European Search Report for European Patent Application No. EP 99 66 0076, mailed Apr. 4, 2000.

POROUS COATING PIGMENT AND A METHOD FOR ITS PRODUCTION

BACKGROUND OF THE INVENTION

The invention relates to a calcium carbonate pigment suitable for the coating of a material web and to a method for the production of a porous coating pigment. The invention also relates to cellulose-containing printing substrate which has a coating layer which contains calcium carbonate.

The pigments to which the invention relates are commonly used for the coating of a material web, such as paper or board. The printing substrates to which the invention relates are, for their part, used as substrates in forming text, pictures or other such symbols by adding printing ink onto the substrate. Typical printing techniques include techniques using liquid-containing printing inks, in particular inkjet printing.

1. Field of the Invention

Typical printing substrates include paper and board. The printing substrate may also be an inkjet printing paper. "Inkjet printing paper" denotes paper which is used as the printing substrate when the inkjet printing technique is used. Inkjet printing paper may be, for example, a strongly or weakly stock-sized paper, a wood-free stock-sized or surface-sized paper or a paper developed specifically for inkjet printing.

Producing a good print quality by the inkjet printing technique sets both structural and physicochemical requirements on the surface part of the paper. The main objective regarding the paper is that ink should dry as rapidly as possible on the paper surface and should not penetrate into the fibre layer. Thus better colour density and contrast are achieved and, furthermore, print through is reduced.

The most important requirements set on successful inkjet printing are:

- the ink must dry very rapidly on the surface of the printing substrate;
- the density of the print must be high;
- the side walls must be sharp;
- dot gain must be controllable; and
- the print must be well resistant to water, light and rubbing.

The most important property of inkjet printing paper in meeting the above-mentioned requirements in colour printing is ink absorbency, which includes absorption speed, absorption capacity and the orientation of absorption. The absorption speed must in particular in colour printing be so high that a preceding drop has time to become absorbed before the following ink drop is printed into contact with it. Thus the mixing of the colours can be reduced and the print quality be improved. The absorption time of a drop should preferably be at maximum a few milliseconds. High absorption capacity on the surface of paper for its part helps to bind a sufficient amount of ink in the vicinity of the paper surface. If too little ink is absorbed, the resistance to rubbing of the print decreases, and if the ink is absorbed too strongly, density is reduced and print through may increase. The orientation of absorption for its part affects the ink dot gain.

In single-colour printing, the requirements set on absorption properties are not as high as in colour printing. In single-colour printers the setting time for a drop may be up to 1–10 seconds, whereas in multi-colour printers a setting time of even less than 1 ms may be required in order that the ink drops should not become mixed. If the paper surface is sufficiently porous, rapid setting may be achieved, in which case the solvent in the ink drop does not have time to spread the drop too much and, also, successively printed drops will not become mixed together. The porosity of the paper surface should also be uniform in order that absorption should be as homogeneous as possible. The surface of the printing substrate should preferably have densely and evenly distributed narrow pores in the orientation of the substrate thickness.

In the manufacture of a printing substrate, it is known to apply, to the surface of the substrate, coating compositions which contain pigments in order to improve, for example, its printing and optical properties. In prior art there has not been available an inexpensive mineral-based pigment by means of which a sufficiently high absorbency on paper could be obtained economically.

Synthetic, silicate-based porous pigments have been used for increasing the absorbency of paper and board. These pigments are, however, quite expensive.

It is an object of the invention to eliminate the deficiencies described above and to provide a pigment of a completely novel type and a method for its production. It is also an object of the invention to provide a printing substrate of a completely novel type.

The invention is based on the idea that, in order to produce a pigment with good absorbency, porous calcium carbonate particles are produced through a degradation reaction from a crystalline initial material which contains the initial components for the forming of calcium carbonate and additionally initial components for the forming of reaction products to be removed from the initial material. In the reaction, a substantial portion of the calcium carbonate forms a porous frame in the space occupied by the initial material, around the open space left by the matter leaving the initial material. Calcium carbonate crystals, particularly calcite crystals which include capillary pores, are formed in the reaction. The invention is also based on the use of such porous calcium carbonate particles on the surface of a printing substrate as a pigment which absorbs printing inks or their solvents.

2. Description of Related Art

Porous calcium carbonate products have been disclosed, for example, in U.S. Pat. No. 5,007,964. These products, however, consist of agglomerated particles of calcium carbonate, resembling a bunch of grapes, or of aggregates which have been grown in several directions around the primary cores to form rosette-like crystal structures, as opposed to the particles according to the present invention, i.e. the unitary calcite crystals which include capillary pores.

BRIEF SUMMARY OF THE INVENTION

According to the invention, it has been discovered that calcite crystals with desired structure are obtained as a result of a heat treatment, in which crystalline calcium oxalate is heated to a sufficient temperature for degrading it to calcium carbonate and to carbon monoxide. During a heat treatment, the temperature of the starting material is raised from a starting temperature to a target temperature, this temperature being maintained for at least two hours, after which the produced calcite is allowed to cool slowly, whereupon the desired capillary pores remain in the material. European Patent Application Publication No. 0 515 757 describes a method for the preparation of porous calcium carbonate particles having ink bottle-shaped pores therein. In this method calcium carbonate powder is..blended with sodium chloride, after which the powder blend is calcined at 900° C. for producing calcium oxide particles. The calcium oxide particles are then slaked and carbonated, whereupon the desired product is achieved. The above described method is quite complicated and the structure of its end product does not correspond to the structure of the crystals according to the present invention.

More precisely, the pigment comprises porous crystals of calcium carbonate, having unitary crystalline frame of calcium carbonate around the open space defined by the pores, whereby the specific surface area of the crystals is at least 4 $m^2/g$.

The method according to the invention is characterized in that calcium oxalate is heated in order to produce porous crystals of calcium carbonate. The printing substrate according to the invention is for its part characterized in at least 5% of the calcium carbonate particles are porous calcium carbonate particles having capillary pores and a specific area of at least 10 $m^2/g$ and a mass of 20–80% of the mass of a particle of a dense continuous calcium carbonate having the corresponding outer volume.

Considerable advantages are gained through the invention. Thus, with the help of the invention it is possible to produce pigment particles which are substantially made up of calcium carbonate and which have a higher pore volume than in prior art and thus a more advantageous specific surface area to mass ratio.

A preferred embodiment the invention has the additional advantage that the porous particles according to the invention increase the speed of ink absorption into the substrate surface as compared with calcium carbonate particles according to prior art. This has an advantageous effect in printing by techniques which utilize liquid-containing printing inks. One significant technique of this type is inkjet printing.

When the present invention is applied to inkjet printing substrates it is possible to improve the absorbency of the printing substrate and thereby improve the print quality, in particular in colour printing, in particular when soluble printing inks are used. In addition to soluble printing inks it is also possible to use in inkjet printing, for example, pigmented or so-called hot-melt inks. In colour printing, cyan, magenta and yellow are commonly used as colouring ingredients. The inkjet printing technique is also used in certain colour copiers, colour fax machines and multipurpose machines which are, for example, combinations of a printer, a copier, a fax machine and a scanner.

In a preferred embodiment of the invention it is also possible to reduce the grammage of paper without weakening the other properties, such as strength or optical properties, of the paper.

The invention is directed to a calcium carbonate pigment suitable for the coating of a material web, the pigment comprising porous crystals of calcium carbonate, having unitary crystalline frame of calcium carbonate around the open space defined by the pores, whereby the specific surface area of the crystals is at least 5 $m^2/g$. Preferably, the specific surface area is 10.0–10.0 $m^2/g$.

The invention is also directed to a method for the production of a porous coating pigment, the method comprising heating calcium oxalate in order to produce porous crystals of calcium carbonate. In one embodiment of the method, a material made up substantially of calcium oxalate is taken, to produce pores, the material is heated to a target temperature in order to remove substantially the crystallization water bound in the calcium oxalate and the calcium oxalate is degraded to crystalline calcium carbonate and to carbon monoxide which leaves the material, the target temperature is maintained at least for two hours, and the crystals of calcium carbonate are allowed to cool after the treatment. In the method of the invention, the calcium oxalate can be degraded by heating it to a temperature above 440° C. The calcium oxalate can be degraded by heating it in a substantially nitrogen or air atmosphere. The calcium oxalate can be heated to a temperature of 480–570° C. The calcium oxalate can be degraded by heating it in a substantially carbon dioxide atmosphere. The calcium oxalate can be heated to a temperature of 510–800° C.

The invention is also directed to a cellulose-containing printing substrate which has a coating layer which contains calcium carbonate, wherein at least 5% of the calcium carbonate particles are porous calcium carbonate particles having capillary pores and a specific surface area of at least 10 $m^2/g$ and a mass of 20–80% of the mass of a particle of a dense continuous calcium carbonate having the corresponding outer volume. The specific surface area of the porous particles can be at least 20 $m^2/g$. The mass of the porous particles can be 40–70% of the mass of a particle of a continuous calcium carbonate having the corresponding outer volume. At least 10% of the calcium carbonate particles can be porous particles. At least 20–80% of the calcium carbonate particles can be porous particles. The cellulose-containing substrate can be a paper or board having a grammage of 30–500 $g/m^2$. The printing substrate can be an inkjet printing paper. In addition to calcium carbonate particles and porous calcium carbonate particles, the coat can contain particles of at least one third kind. The coat can contain particles of calcium sulphate, aluminum silicate, kaolin, aluminum hydroxide, magnesium silicate, talc, titanium dioxide, barium sulphate and/or zinc oxide. The coat can contain synthetic pigment particles.

The invention is also directed to the use of a porous calcium carbonate produced by heating calcium oxalate as a substance absorbing printing ink or solvent on the surface of a cellulose-containing material web.

The invention will be examined below in greater detail with the help of a detailed description with reference to the accompanying drawings.

DETAILED DESCRIPTION OF THE INVENTION

Porous calcium carbonate particles are prepared from a solid calcium oxalate $Ca(OX)_2 \cdot H_2O$ by heating. As described above, it is preferable that the temperature of the material is risen fairly rapidly from a starting temperature to a target temperature and that the target temperature is maintained for a sufficient time for the formation of crystalline calcium carbonate. Typical starting temperatures are in the range from 0° C. to 40° C., and the heating time in a target temperature is typically in the range from 0.1 hours to 10 hours, preferably in the range from 0.5 hours to 3 hours. After the heat treatment, porous crystals of calcite are slowly cooled back to a temperature of the environment. The cooling can, for instance, be effected by leaving the product in the heating appliance which is being switched off. Thus, the cooling times are typically and approximately 1.01 to 20 times, preferably 1.1 to 5 times, longer than the used heating times. If a continuous process is used, processing times shorter than mentioned above are preferred.

Figure 1:
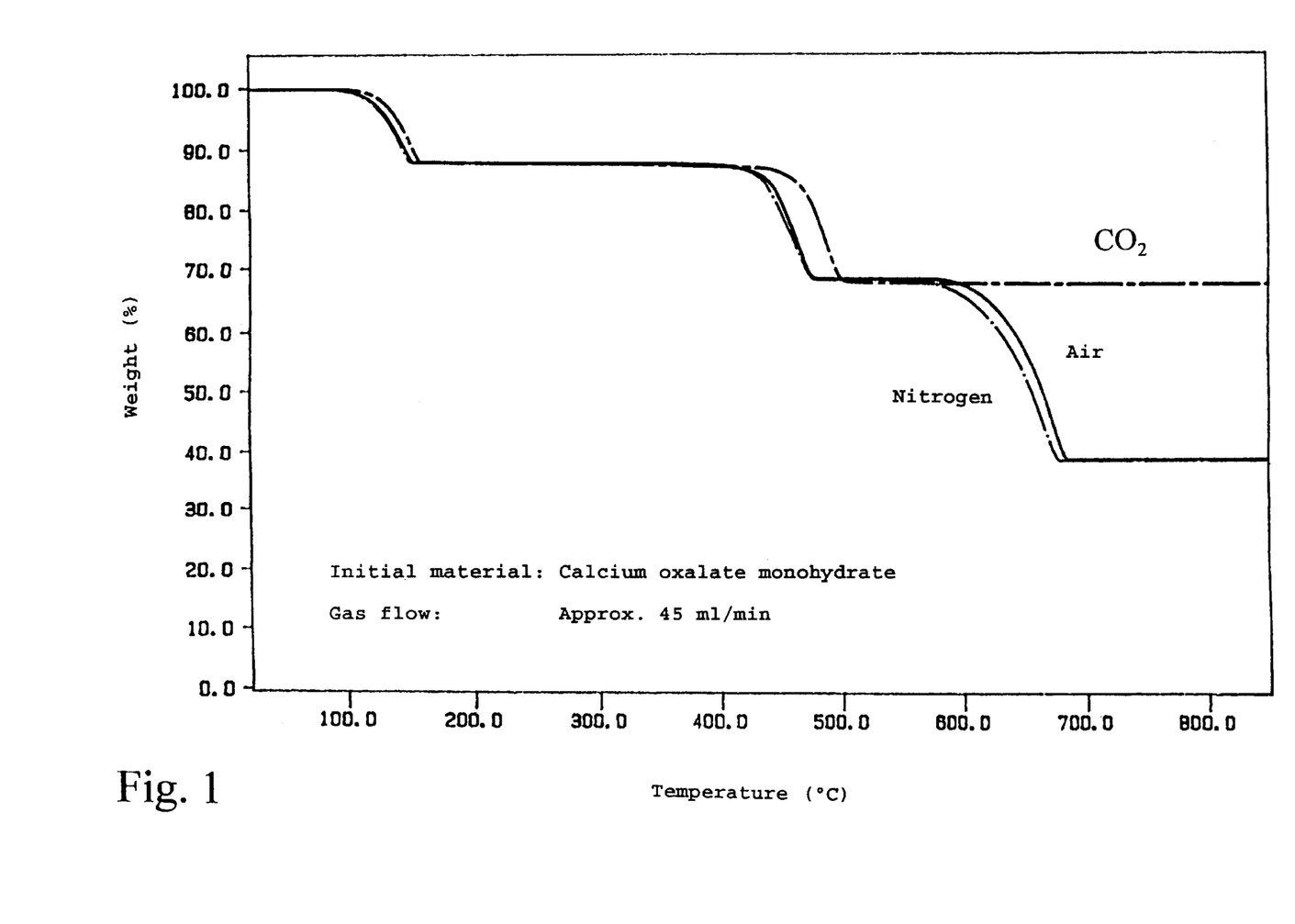
FIG. 1 depicts the mass of a material which is initially calcium oxalate monohydrate and later its degradation product, as a function of temperature when the material is heated.

FIG. 1 shows the mass of the solid as a function of temperature when a solid which is calcium oxalate is heated. The mass of the solid is depicted as heated in nitrogen, air and carbon dioxide atmospheres. When the solid is heated to a temperature slightly above 100° C., a reaction in which the crystallization water separates from the solid begins to take place. As the reaction progresses, the mass of the solid respectively decreases in accordance with reaction equation I:

$$Ca(OOC)_2 \cdot H_2O \rightarrow Ca(OOC)_2 + H_2O. \quad (I)$$

Water leaves as vapour, and the mass of the solid theoretically drops to 87.7% of the initial mass. When the temperature has risen to 160° C., the crystallization water has become removed. When the temperature is further raised to approx. 440° C., there begins to occur the following reaction, in which carbon monoxide leaves the solid, and porous calcium carbonate remains. Reaction equation II is as follows:

$$Ca(OOC)_2 \rightarrow CaCO_3 + CO. \quad (II)$$

In one embodiment, the calcium oxalate is degraded by heating it to a temperature above 440° C. $Ca(OOC)_2$ has degraded completely when the temperature has risen in a nitrogen or air atmosphere to approx. 480° C. and in a carbon dioxide atmosphere to approx. 510° C. At this time the mass of the solid is theoretically 68.5% of the initial mass. When the formed calcium carbonate is heated further to above approx. 580° C., there begins to occur in a nitrogen or air atmosphere a reaction according to reaction equation III, in which carbon dioxide leaves the solid.

$$CaCO_3 \rightarrow CaO + CO_2. \quad (III)$$

The final product of this reaction is calcium oxide, which is not suitable for use as a coating pigment. For this reason, when calcium carbonate particles are produced in a nitrogen or air atmosphere by heating, the temperature must not be raised above 580° C. However, when the heating is carried out in a carbon dioxide atmosphere, the degradation of calcium carbonate to calcium monoxide according to reaction equation III does not occur, and higher temperatures can be used.

The calcium oxalate initial material is preferably in a hydrous form, containing one or two water molecules per one calcium oxalate molecule. The initial material is preferably at least 50% pure.

Figure 2:
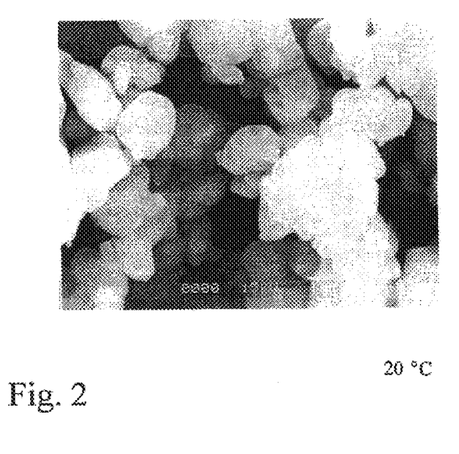
FIG. 2 is an electron microscope photograph of calcium oxalate monohydrate at 20° C.
Figure 3:
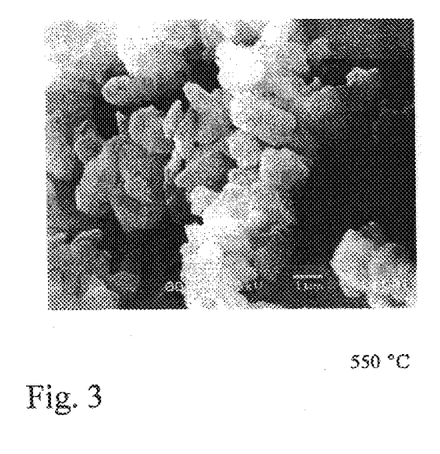
FIG. 3 is an electron microscope photograph of a material produced from the material of FIG. 2 in accordance with FIG. 1, in an air atmosphere by heating it to 550° C.
Figure 4:
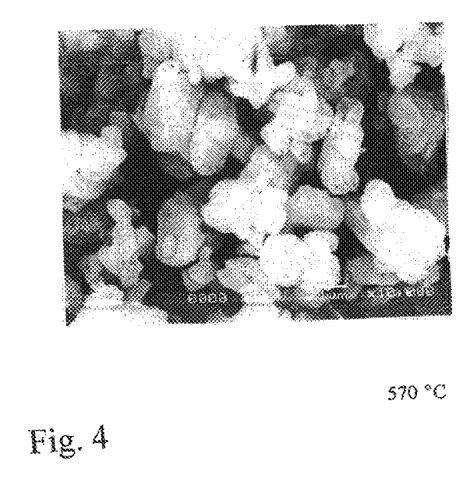
FIG. 4 is an electron microscope photograph of a material produced from the material of FIG. 2 in accordance with FIG. 1, in an air atmosphere by heating it to 570° C.
Figure 5:
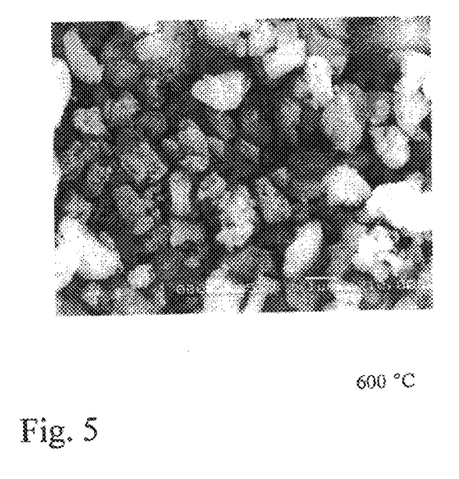
FIG. 5 is an electron microscope photograph of a material produced from the material of FIG. 2 in accordance with FIG. 1, in an air atmosphere by heating it to 600° C.
Figure 6:
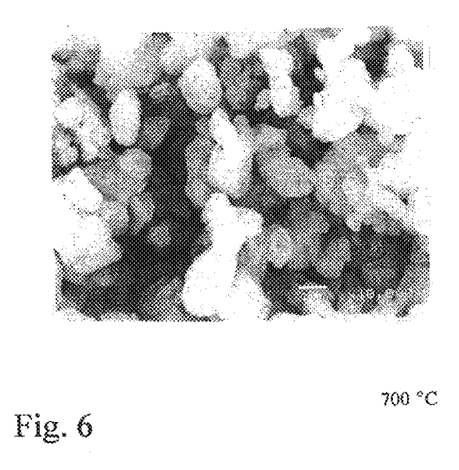
FIG. 6 is an electron microscope photograph of a material produced from the material of FIG. 2 in accordance with FIG. 1, in an air atmosphere by heating it to 700° C.
Figure 7:
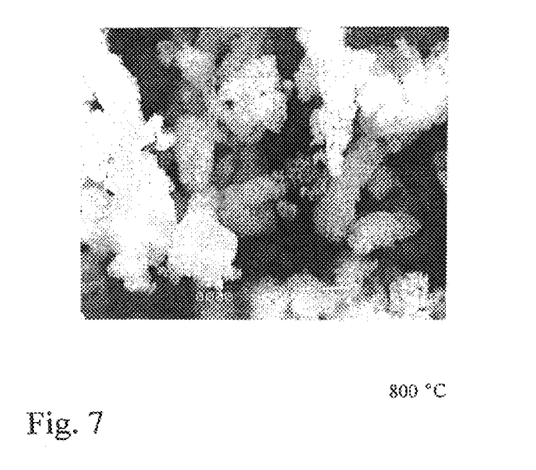
FIG. 7 is an electron microscope photograph of a material produced from the material of FIG. 2 in accordance with FIG. 1, in an air atmosphere by heating it to 800° C.

FIG. 2 shows the structure of one initial material seen through an electron microscope, and FIGS. 3–7 show the structures of the materials formed from the initial material by heating it to different temperatures. The heating was done in a nitrogen atmosphere. There form open pores inside the structure at those sites from which water or carbon monoxide is evaporated and vaporized. The figure shows that the porosity of the material increases as a function of heating temperature. For this reason, considering the porosity of the calcium carbonate particles, it is advantageous to heat the material to a temperature of 480–800° C., highly advantageous to heat it to 550–650° C. Heating to above 580° C. must be carried out in a carbon dioxide atmosphere.

In consequence to the heat treatment, the specific surface area of the material multiplies. The specific surface area of a pigment according to the invention is at least 4.0 $m^2/g$, preferably approx. 5.0–100.0 $m^2/g$ and highly preferably above approx. 10 $m^2/g$.

Calcium carbonate particles can be prepared by grinding the calcium oxalate initial material to such a particle size that, when this powder is heated, a suitable calcium carbonate particle size is obtained.

In a preferred process for the production of porous calcium carbonate particles the procedure is as follows:

Powder consisting of calcium oxalate monohydrate is taken.

The powder is heated in order to remove the crystallization water and to degrade the calcium oxalate by raising the temperature of the powder from room temperature to approx. 600° C., and by maintaining this temperature for approx. 140–200 minutes. Heating to above 550° C. is carried out in a carbon dioxide atmosphere. At temperatures lower than this, an atmosphere of, for example, air can be used.

The formed calcium carbonate material is cooled to room temperature in approx. 150–300 minutes. The carbon dioxide atmosphere is maintained until the temperature has dropped below 500° C.

Optionally, the calcium carbonate material is ground further to the desired particle size.

For a continuous process the above parameters could be modified so that the high heating temperature is maintained for approx. 5–400 minutes and the cooling to an end temperature is effected in 10–300 minutes.

Thereafter the powder of a porous calcium carbonate material can be slurried and used for the preparation of a coating material.

Examples of pigments which can be used in the coating composition in addition to calcium carbonate particles according to the present invention include ground calcium carbonate, precipitated calcium carbonate, calcium sulfate, aluminium silicate, kaolin (hydrous aluminium silicate), aluminium hydroxide, magnesium silicate, talc (hydrous magnesium silicate), titanium dioxide and barium sulphate, and mixtures of these. Synthetic pigments can also be used. Special kaolins and calcium carbonates, as well as barium sulphate and zinc oxide, can also be mentioned as examples of special pigments.

In principle, any known binding agents commonly used in paper manufacture can be used as binders in the coating composition. In addition to individual binders it is also possible to use mixtures of binding agents. Examples which can be mentioned of typical binding agents include synthetic latex-type binders consisting of polymers or copolymers of ethylenically un-saturated compounds, such as butadiene-styrene type copolymers which may additionally contain a comonomer having a carboxylic group, such as acrylic acid, itaconic acid or maleic acid, and poly(vinyl acetate) which contains comonomers having carboxylic groups. In combination with the above-mentioned agents it is further possible to use as binders, for example, water-soluble polymers, starch, CMC, hydroxy ethyl cellulose and poly(vinyl alcohol).

In the coating composition there can further be used conventional additives and adjuvants, such as dispersing agents (e.g. sodium salt of poly(acrylic acid)), substances for adjusting the viscosity and water retention of the composition (e.g. CMC, hydroxyethyl cellulose, polyacrylates, alginates, benzoate), so-called lubricating agents, hardeners for improving the water resistance, optical agents, anti-foaming agents, pH regulating agents and substances for preventing product degradation. The lubrication agents include sulphonated oils, esters, amines, calcium or ammonium stearates; the agents improving water resistance include glyoxal; the optical agents include diaminostilbene and derivatives of disulphonic acid; the anti-foaming agents include phosphate esters, silicones, alcohols, ethers, vegetable oils; the pH regulating agents include sodium hydroxide, ammonia; and finally, the anti-degradation agents include formaldehyde, phenol and quaternary ammonium salts.

The coating compositions according to the present invention can be used both as so-called pre-coat pastes and as surface coating pastes. A coating composition according to the invention contains mainly 100 parts by weight of at least one pigment, 0.1–50 parts by weight of at least one binder and 0–10 parts by weight of other additives known per se. 1–100 parts by weight of the pigment is a pigment made up of porous calcium carbonate particles according to the present invention.

The typical composition of a coating mixture is as follows:

| | |
|---|---|
| Porous calcium carbonate pigment | 20–100 parts by weight |
| Conventional calcium carbonate pigment | 80–0 parts by weight |
| Thickener | 0.1–2.0 parts by weight |
| Binder | 1–20 parts by weight |
| Additives and adjuvants | 0.1–10 parts by weight |
| Water | balance |

The components of the compositions are typically added in the following order:
1. Main pigment
2. Other pigments
3. Water-soluble binders
4. Latexes
5. Additional water and pH regulating agents The pigments are usually mixed with the coating composition in a slurry.

In the present invention, "printing substrate" denotes a material web or a material web coated with a coating agent. "Material web" for its part denotes paper or board or a corresponding cellulose-containing material which is derived from a lignocellulosic raw material, in particular from wood or from annual or perennial plants. Said material may be wood-containing or wood-free, and it may be produced from mechanical, semi-mechanical (chemi-mechanical) or chemical pulp. The pulp may be bleached or unbleached. The material may also contain recycled fibres, in particular reclaimed paper or reclaimed board. The grammage of the material web typically ranges from 30 to 250 g/m², in the manufacture of coated paper it is preferably approx. 30–100 g/m².

In the manufacture of a printing substrate according to the invention there is applied to the first, second or both sides of the cellulose-containing material web a coating composition which contains a pigment component consisting of porous calcium carbonate. The porous calcium carbonate particles present in the pigment may be prepared, for example, by a method similar to that in the preceding example. The porous calcium carbonate particles are deemed to be particles which substantially consist of calcium carbonate and which comprise pores so that the mass of these particles is at least 10%, preferably 20–80%, highly preferably 40–70%, of the mass of a particle produced of a continuous calcium carbonate crystal having a corresponding outer volume. The specific surface area of the porous calcium carbonate particles is at least 10 m²/g, preferably more than 15 m²/g, and highly preferably more than 30 m²/g. According to the invention, such particles should make up at least 1%, preferably more than 10%, highly preferably more than 40%, and most suitably 80%–100%, of the calcium carbonate particles in the printing substrate. When a pigment such as this is used instead of a conventional calcium carbonate pigment, the absorbency of the printing substrate can be improved by at least 10%, and advantageously by at least 30%.

Options deviating from the embodiments described above are also conceivable within the framework of the present invention. Calcium carbonate particles and pigment substances according to the invention can also be used for the absorption of a liquid substance in, for example, blotting papers. The pigment according to the invention may also be added to other coating substances, such as paints.

The following, non-limiting examples illustrate the invention:

EXAMPLE 1

Preparation of Calcium Carbonate Particles

In this experiment, 2–4 g of an analytically pure calcium oxalate ($CaC_2O_4 \cdot H_2O$) was taken, and it was divided and placed in porcelain crucibles. The samples were heated each in turn in a muffle furnace in an air atmosphere from room temperature so that the temperature of the first sample was raised to 510° C., that of the second to 530° C., and those of the subsequent samples respectively to 550° C., 570° C., 600° C., 700° C. and 800° C. The samples were each kept at the maximum temperature for approx. 2–3 hours, whereafter they were cooled inside the furnace slowly to room temperature.

A portion of each sample was coated with a very thin gold layer, whereafter the samples were examined using an electron microscope. Some photographs are shown at a magnification of approx. 10,000 times in FIGS. 3–7.

Of the cooled samples, the samples heated to 550° C. and to 800° C. were selected for an analysis by X-ray diffraction measurement. Samples of the original calcium oxalate and of a finely-divided calcite were selected as reference samples. The analysis of the samples showed that the sample heated to 550° C. was calcite. The sample heated to 800° C., for its part, was calcium oxide. The calcium oxide was in an amorphous form so that the granules were clearly separate one from another. The sample heated to 550° C. was crystalline calcite.

Furthermore, the sample heated to 600° C. was analyzed by measuring the specific surface area of the sample by using a Micromeritics 2200 & 2205 type surface area analyzer. The specific surface area obtained for the sample by assuming that the specific weight of calcite was 2.71 g/cm$^3$ was 15 m$^2$/g.

EXAMPLE 2

Coating of a Paper Web

A coating composition is produced by mixing together 70 parts by weight of a porous calcium carbonate pigment produced according Example 1, 30 parts by weight of kaolin, 0.4 parts by weight of CMC, and 12 parts by weight of a styrene-butadiene latex.

The coating paste is used for the coating of a paper web in a Heli-coater laboratory coater (blade coater). The paper web used is a wood-free paper having a grammage of 60 g/m$^2$, and the coating composition is applied to it at a rate of 10 g per square meter.

The coated paper has an excellent ink and solvent absorbency, which prevents the spreading of inks in connection with inkjet printing and speeds up the drying of ink.

What is claimed is:

1. A coating composition for coating a material web, said composition comprising a calcium carbonate pigment, wherein said pigment comprises a unitary crystalline frame of porous crystals of calcium carbonate around open spaces defined by pores, wherein a specific surface area of said crystals is at least 4 m$^2$/g.

2. The coating composition of claim 1, wherein said specific surface area of said crystals is 10.0–100.0 m$^2$/g.

3. A method for producing a coating composition for coating a material web, said method comprising:

(a) heating a material comprising calcium oxalate to produce porous crystals of calcium carbonate; and (b) mixing said porous crystals with a binding agent, thereby producing a coating composition for coating a material web.

4. The method of claim 3, wherein said material of (a) is heated to a target temperature to remove substantially the crystallization water bound in the calcium oxalate, to effect carbon monoxide leaving said material, and to degrade the calcium oxalate to said crystals of calcium carbonate, and wherein said target temperature is maintained at least for two hours and said crystals of calcium carbonate are allowed to cool after the treatment.

5. The method of claim 3, wherein said calcium oxalate is heated to a temperature above 440° C.

6. The method of claim 3, wherein said calcium oxalate is heated in a substantially nitrogen or air atmosphere.

7. The method of claim 3, wherein said calcium oxalate is heated to a temperature of 480–570° C.

8. The method of any one of claims 3–5 wherein said calcium oxalate is heated in a substantially carbon dioxide atmosphere.

9. The method of claim 8, wherein said calcium oxalate is heated to a temperature of 510–800° C.

10. The coating composition of claim 1, wherein said porous crystals of calcium carbonate are prepared by a method comprising heating calcium oxalate.

11. The coating composition of claim 10, wherein said calcium oxalate is heated for at least two hours at a temperature that substantially removes crystallization water bound to said calcium oxalate and degrades said calcium oxalate to said porous crystals of calcium carbonate and to carbon monoxide, and then is cooled.

12. The coating composition of claim 10 or 11, wherein said calcium oxalate is heated at a temperature greater than 440° C.

13. The coating composition of claim 12, wherein said temperature is 480–570° C.

14. The coating composition of claims 10 or 11, wherein said calcium oxalate is heated in a substantially nitrogen or air atmosphere.

15. The coating composition of claim 14, wherein said temperature is 440–580° C.

16. The coating composition of claim 15, wherein said temperature is 480–570° C.

17. The coating composition of claim 10 or 11, wherein said calcium oxalate is heated in a substantially carbon dioxide atmosphere.

18. The coating composition of claim 17, wherein said temperature is a temperature greater than 440° C.

19. The coating composition of claim 18, wherein said temperature is 510–800° C.

20. The method of claim 4, wherein said calcium oxalate is degraded by heating it to a temperature above 440° C.

21. The method of claim 20, wherein said calcium oxalate is heated to a temperature of 440–580° C.

22. The method of claim 21, wherein said calcium oxalate is heated to a temperature of 480–570° C.

23. The method of claim 20, wherein said calcium oxalate is heated to a temperature of 510–800° C.

24. The method of claim 4 or 20, wherein said calcium oxalate is degrading by heating it in a substantially nitrogen or air atmosphere.

25. The method of claim 24, wherein said temperature is 440° C.–580° C.

26. The method of claim 25, wherein said temperature is 480° C.–570° C.

27. The method of claim 5, wherein said temperature is 440° C.–580° C.

28. The method of claim 5, wherein said temperature is 510° C.–800° C.

29. The method of claim 6, wherein said temperature is 440° C.–580° C.

30. The method of claim 29, wherein said temperature is 480° C.–570° C.

31. The coating composition of claim 1, further comprising a binding agent.

32. The coating composition of claim 1, wherein said specific surface area of said crystals is approximately 5.0–100.0 m$^2$/g.

* * * * *